Figure 3:
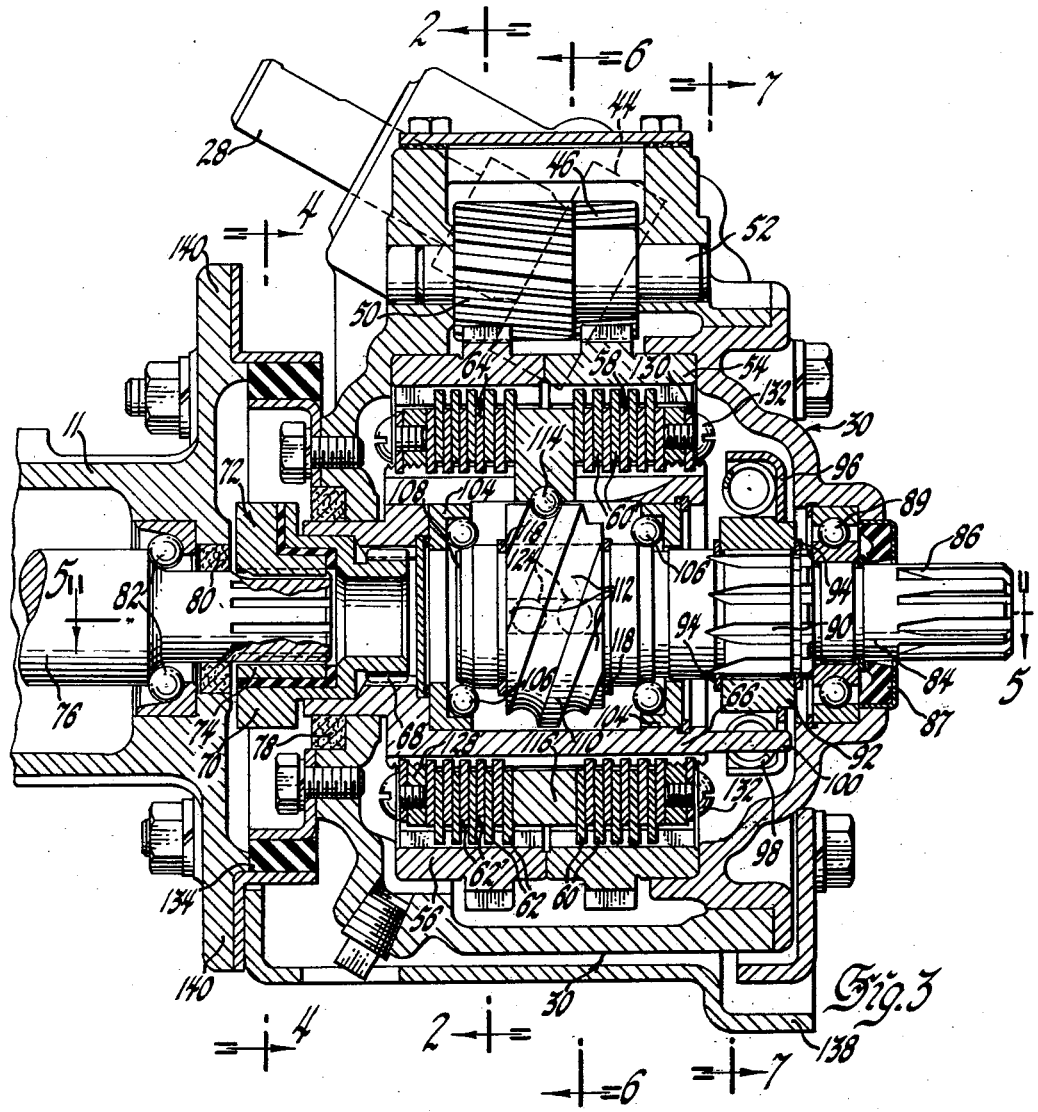

Nov. 6, 1962 K. H. HANSEN 3,062,069
MECHANICAL FOLLOW-UP MECHANISM
Filed Nov. 24, 1953 3 Sheets-Sheet 1
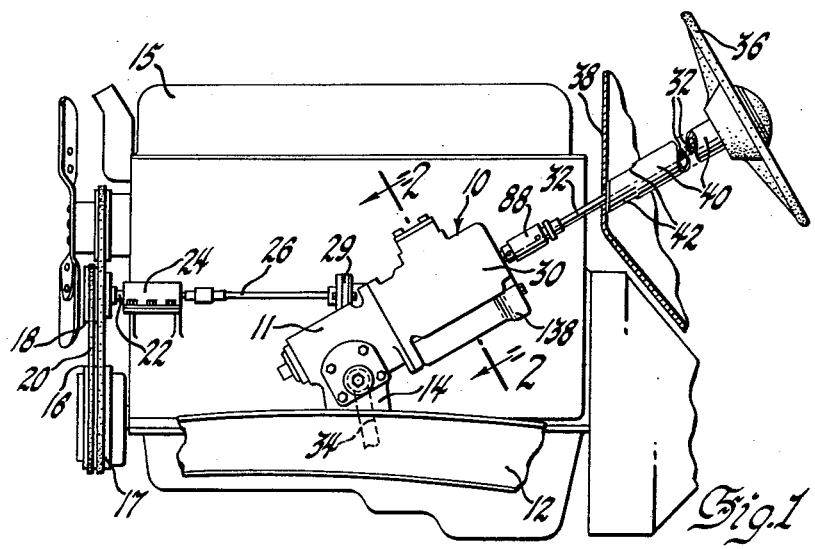
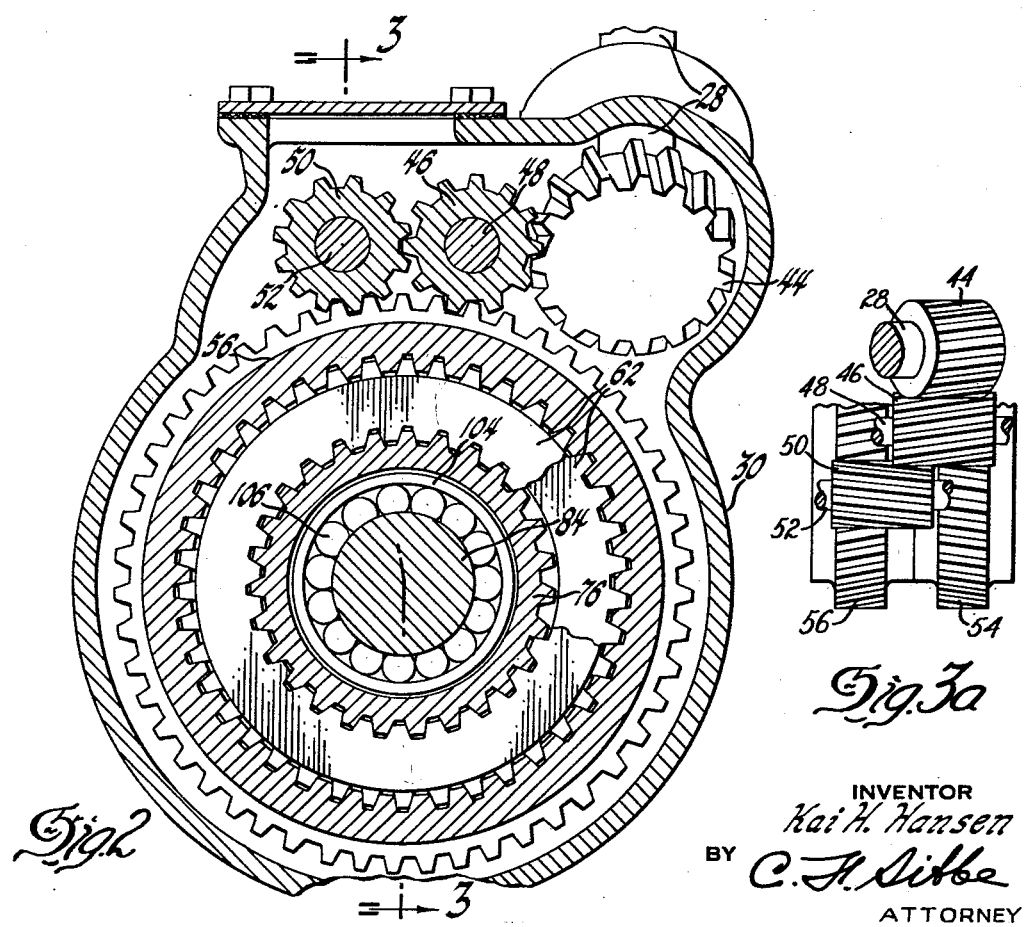
INVENTOR
*Kai H. Hansen*
BY *C. H. Sitke*
ATTORNEY Nov. 6, 1962 K. H. HANSEN 3,062,069
MECHANICAL FOLLOW-UP MECHANISM
Filed Nov. 24, 1953 3 Sheets-Sheet 2

INVENTOR
Kai H. Hansen
BY C. H. Dibble
ATTORNEY.

Nov. 6, 1962   K. H. HANSEN   3,062,069
MECHANICAL FOLLOW-UP MECHANISM
Filed Nov. 24, 1953   3 Sheets-Sheet 3
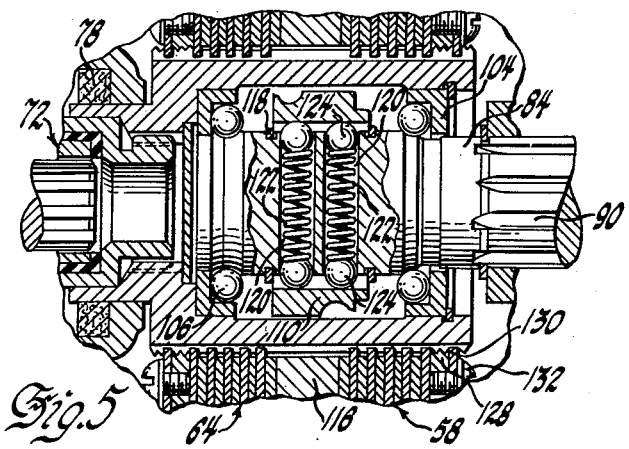
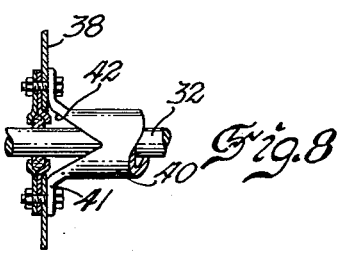
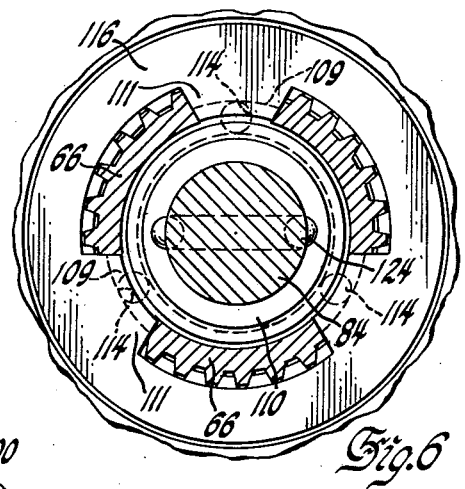
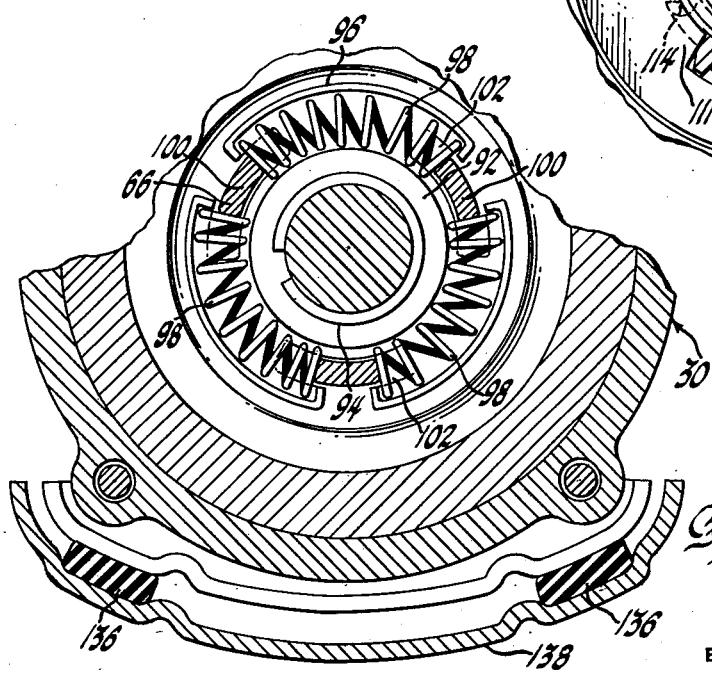
INVENTOR
Kai H. Hansen
BY C. H. Sitbe
ATTORNEY Patented Nov. 6, 1962

3,062,069
MECHANICAL FOLLOW-UP MECHANISM
Kai H. Hansen, Detroit, Mich., assignor to General Motors Corporation, Detroit, Mich., a corporation of Delaware
Filed Nov. 24, 1953, Ser. No. 394,101
1 Claim. (Cl. 74—388)

This invention concerns a mechanical follow-up or servo mechanism of novel construction and operation. While the mechanism possesses other utility, it is considered especially valuable as applied to the power steering of a motor vehicle and it consequently will be particularly described in that connection.

The power steering of trucks, buses, and heavy off-the-road vehicles has been practiced for some time; indeed in many cases, due to high-front end loadings, oversize tires, etc., it is almost essential that the vehicle be so steered, the force required to turn the dirigible wheels, at least when the vehicle is stationary or traveling at low speed, exceeding the strength of many individuals. Recently, power steering has been adopted for use in passenger cars and the innovation has been met with widespread acceptance, not only because it reduces steering effect, but because in most cases it provides a safety factor, substantially eliminating steering wheel fight or loss of wheel control from tire blow-outs, road bumps and ruts, etc.

In the instance of the smaller cars, particularly, the additional cost of the auxiliary apparatus, especially when taken in relation to the over-all cost of the car, has been considered objectionable in many quarters. This objection stems from the fact that the apparatuses presently available are hydraulically operated. Thus, each necessarily includes four fundamental and fairly expensive components; namely, a reservoir for the fluid medium, a pump drawing from the reservoir, a power cylinder operatively linked to the steering elements, and a valve controlling the flow between the pump and power cylinder. In addition, various fixtures and auxiliary valves are required, not to mention the necessary high pressure connecting lines. The specified major parts, and especially the pump and valve, must be manufactured to very close tolerances for successful operation, and this, of course, contributes to the cost of the apparatus. While a number of mechanical power steering gears have been heretofore proposed, such gears are open to objection on various grounds. Thus, these gears have been deservedly criticized on the basis that they are lacking in the compactness which characterizes any properly engineered product of the general class. A further criticism goes to the fact that means providing for adjustment of certain parts prone to become misaligned on continued use of the gears are either lacking or positioned in difficultly accessible locations. Still another major fault common to all of the prior gears is extreme noisiness in operation. Also, a majority of the earlier constructions are deficient in that no satisfactory means are provided allowing for disengagement of the power when the steering resistance reaches an abnormal value as, for example, when one of the dirigible wheels is being turned against a high curb in parking.

My invention has as its principal object to provide a mechanical power steering gear which is not subject to the above indicated deficiencies.

Another object is to provide a mechanical power gear which is positive in operation, which comprises a minimum number of inexpensive parts, and which is readily assembled, installed and serviced.

A further object is to supply a mechanical power gear characterized in operation in that the power exerted at the rim of the steering wheel is substantially proportional to the road resistance encountered.

Still another object is to provide a mechanical power gear which allows for ordinary manual steering of the vehicle should the power source fail for any reason.

Figure 4:
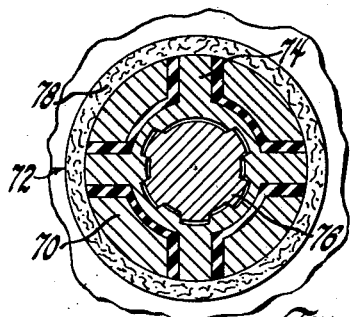

Additional objects and features of the invention will be apparent from the following specific description which will proceed with reference to the accompanying drawings illustrating a preferred embodiment of the invention and in which:

FIGURE 1 shows the particular gear as preferably applied;
FIGURE 2 is a section on the line 2—2 in FIGURE 1;
FIGURE 3 is a longitudinal section on the line 3—3 in FIGURE 2;
FIGURE 3a is a fragmentary plan showing the drive gearing incorporated in the unit;
FIGURE 4 is a section on the line 4—4 in FIGURE 3;
FIGURE 5 is a section on the line 5—5 in FIGURE 3;
FIGURE 6 is a section on the line 6—6 in FIGURE 3;
FIGURE 7 is a section on the line 7—7 in FIGURE 3; and
FIGURE 8 is a fragmentary detail showing parts appearing in FIGURE 1.

Referring first to FIGURE 1, the power steering assembly, generally denoted by the numeral 10, will be seen as supported with the gear box 11 from the frame 12 of the vehicle through a bracket mounting 14. The unit is powered from the crankshaft of the engine 15 by means including a belt 20 interconnecting pulleys 16 and 18, pulley 16 being co-axial with and deposed forwardly of the lower fan belt pulley 17. Pulley 18 is fast on a shaft section 22 which extends through a bracket mounting 24, fixed to the engine block 15, to connect with a jackshaft 26, in turn coupled at 29 to a shaft section 28 (FIGURE 2) terminating within the casing 30 housing the principlal parts of the assembly.

Gear box 11 may confine any suitable mechanism for translating the rotary motion of the steering shaft 32 into a rocking motion manifested through the pitman arm 34. As an exemplary mechanism may be noted that disclosed in Hawkins Patent 2,267,524, granted December 23, 1941.

Steering shaft 32 carries at its upper end a steering wheel 36, the shaft being surrounded upwardly of a dash panel or fire wall 38 by a mast jacket 40. This jacket is doubly apertured or slotted at 42 (FIGURE 8) for a reason which will subsequently appear and may be secured to the firewall through a pair of flanges 41, which may be integral with the mast jacket. An insulating ring may be interposed, if desired, between each flange and the panel face.

Carried at the end of the shaft section 28 within the casing 30 is a helical drive pinion 44 (FIGS. 2, 3 and 3a) which meshes with the helical teeth of a pinion 46 fixed on a stub shaft 48 journalled in the casing 30. Pinion 46 also meshes with a second helical driven pinion 50 fixed to a shaft 52 similarly journalled at either end in the casing 30. Pinion 46 serves to drive an upper or right-hand helical ring gear 54 while pinion 50 meshes with the helical teeth of a lower ring gear 56.

With the gearing as just described, it should be apparent that with the drive pinion rotating clockwise (viewing FIG. 3a from the left side of the sheet) the driven pinion 46 is oppositely rotated to drive the ring gear 54 clockwise, while the ring gear 56 is rotated counterclockwise by reason of the clockwise rotation of the driven pinion 50. The rotation of the ring gears is constant so long as the engine of the vehicle is turning over.

In a commercial embodiment found satisfactory on test, the angle of the left-hand helix in the case of the drive pinion 44 is 49°, that of the driven pinions and the ring gears, 20°. As shown, the helix is right hand in the instances of pinion 50 and ring gear 54; left hand, in the instance of ring gear 56.

Ring gear 54 encircles a multi-plate friction clutch generally indicated by the numeral 58, the driving components 60 of the clutch being splined to the ring gear. Similarly, the lower ring gear 56 is internally splined for connection with the driving components 62 of a second multi-plate clutch 64.

The driven components 60' and 62' of the clutches are connected by splining to a sleeve 66, which is internally splined at 68 in a manner complementary to the external splining of the upper or right-hand component 70 of a flexible coupling 72 (FIGURE 4). The lower or left-hand component 74 of such coupling is internally splined to receive the splined end of a shaft 76 extending from the gear box 11. This shaft, in the interest of simplicity, may be considered as terminating within the gear box in a worm mating with a gear section integral with the pitman arm 34 (FIGURE 1). The linkage between the pitman arm and the dirigible wheels, not shown, may be of any suitable type.

From the foregoing, it should be clear that the sleeve 66 with the shaft 76 constitutes the output of the illustrated system.

A seal 78 surrounding the left-hand end of the sleeve 66 prevents the escape of lubricating fluid normally contained within the casing 30. A similar seal 80 surrounds the reduced portion of the shaft 76, which turns in a ball bearing 82.

The input of the system is represented by a shaft 84, splined at 86 for connection to the steering shaft 32 through a flexible coupling 88 (FIGURE 1) of any suitable type. In addition to splines 86, shaft 84, which turns in ball bearings 89 just inward of an oil seal 87, also carries splines 90 through which the shaft connects with the hub portion 92 of a spring centering device. The centering device further comprises an annular member 96 which is locked to the hub 92 so that the two parts are functionally integral. Lateral movement of the hub on the shaft 84 is prevented by rings 94 received in grooves formed in the shaft.

Member 96 acts as a retainer for a plurality of sector springs 98 (FIGURE 7) maintained under a predetermined degree of compression by prongs 100 integral with the previously described sleeve 66 and extending through slots 102 in the member 96. With this arrangement, it should be apparent that whenever the load on the sleeve 66 and the shaft 76 exceeds the force of the springs 98, shaft 84 is rotatable in either direction relative to the sleeve to a limited extent determined by the clearance between the projections 100 and the ends of the corresponding slots 102.

Sleeve 66 confines a pair of annular races 104 for balls 106 providing bearings for the lower or left hand end of the shaft 84, which terminates at 108. Mediate these bearings is an energizer collar or clutch actuating part 110 having grooves 112 forming a discontinuous helix. Balls 114 (FIGURE 6) seat in these grooves and also in arcuate non-helical grooves 109 formed in the spoke portions 111 of a ring piece 116 surrounding the collar 110. The portions 111 are accommodated in slots formed in the sleeve 66.

Lateral movement of the collar 110 on the shaft 84 is prevented by rings 118 seating in grooves formed in the shaft. Accordingly, rotary movement of the shaft 84 in either direction relative to the sleeve 66 as permitted by the above-described, lost-motion connection, will cause an axial shifting of the ring 116 with engagement of one or the other of the clutches 58, 64 depending upon the direction of the shifting. This, of course, results in powering of the sleeve and with it the shaft 76.

Referring now particularly to FIGURE 5, it will be observed that a portion of the shaft 84, surrounded by the clutch actuating element 110, has two bores 120 in each of which is confined a compression spring 122 loading balls 124 at either end of the spring. The outer surfaces of these balls seat in hemispherical recesses formed in the internal wall of the collar 110. The purpose of this arrangement is to provide a safety device, analogous to a relief valve in an hydraulic servo, operating to prevent damage to the mechanism in the event of an abnormal load. Thus, it will be understood that should the resistance to the turning of the sleeve 66 and shaft 76 reach a predetermined value set by the pre-loading of the springs 122, balls 124 will be forced inwardly out of the recesses in the collar 110 against the resistance of the springs so that any further rotation of the shaft 84 relative to the sleeve will not bring about further rotation of the collar 110 and further loading of the clutch corresponding to the direction of the relative rotation. In the absence of such a scheme, assuming conditions sufficiently severe, the developed friction-generated heat could conceivably cause actual welding or freezing together of the clutch plates.

Having reverted to the clutches, 58, 64, it should be noted that associated with each clutch is an annular adjustor member 128 threaded on the sleeve 66 and locked in selected position by a ring 130 secured by screws 132.

It is an important feature of the invention that there is no metal to metal contact between any of the parts of the power steering unit and the auxiliary apparatus. To this end, there is provided in addition to the flexible couplings 72 and 88, a ring 134 formed of any suitable elastomeric or non-metallic, resilient material, through which the flange connection between the casing 30 and the gear box 11 is made, and a pair of blocks 136 (FIGURE 7) also fabricated of such a material, through which the upper portion of the unit is supported from the gear box via an under-bracket 138 bolted or otherwise suitably secured to the flange 140. By so isolating the unit from the auxiliary parts, noise-producing vibrations which would otherwise be transmitted thereto are effectively absorbed. Such vibrations as to tend to be transmitted in an upward direction are for the most part dissipated by the previously-mentioned slotting 42 of the mast jacket 40. The termination of this jacket at the fire wall 38 of itself markedly reduces vibrations reflected as noise.

To describe now the over-all operation of the disclosed system, let it be assumed that the steering wheel 36 is rotated clockwise to negotiate a right turn. Assuming further that the steering resistance, i.e. the resistance to the rocking of the pitman arm 34, exceeds the pre-loading of the arcuately arranged centering springs 98 but is less than the pre-loading of the springs 122, shaft 84, which represents an extension of the steering shaft, will initially rotate relative to the sleeve 66, and hence to the shaft 76, to bring about an upward axial shifting of the clutch-actuating ring 116 through the helically grooved collar 110. With the consequent engagement of the clutch 58, the servo is brought into play and the dirigible wheels are power steered to the right as desired. On cessation of the effort at the steering wheel, springs 98 promptly return the shaft 84 to its neutral centered relation and the dirigible wheels are returned to their straight-head position by the geometry of the steering linkage, just as in the case of conventional steering systems.

In the case of a left turn, the action obviously will be just the opposite of that above described, clutch 64, rather than clutch 58, becoming engaged so that the shaft 76 is powered counterclockwise.

The pre-loading of the centering springs 98 is largely arbitrarily, being gauged to provide the particular degree of "steering feel" desired. Assuming a pre-loading equivalent to about three pounds of effort at the steering wheel, as is customary, the steering may be accomplished solely by manual effort through the springs, when the steering resistance is of a low value.

Should the power fail or should it become necessary to steer the vehicle with the engine dead, the steering, if the resistance exceeds the pre-loading of the centering springs, is readily accomplished through the spring retainer 96 (FIGURE 7) and the projections 100 integral with the sleeve 66. The lost motion represented by the clearance between the projections and the end walls of the slots 102 within which the projections are received, is not such as to present any difficulty.

Having thus described and illustrated my invention, what I claim is:

In a vehicle including a fire wall separating an engine compartment and an operator's compartment, a steering system comprising a steering shaft, a steering arm and a mechanical servo incorporating input means having operative connection with said shaft and output means operably connected to said steering arm, said mechanical servo being located within said engine compartment, said steering shaft extending through said fire wall and being surrounded within said passenger compartment by a jacket which terminates at said wall and has a slot therein adjacent said wall.

References Cited in the file of this patent

UNITED STATES PATENTS

| | | |
|---|---|---|
| 1,802,004 | Derr | Apr. 21, 1931 |
| 2,311,010 | Vickers | Feb. 16, 1943 |
| 2,775,133 | Armantrout | Dec. 25, 1956 |
| 2,833,154 | Barnes et al. | May 6, 1958 |

FOREIGN PATENTS

| | | |
|---|---|---|
| 572,934 | Great Britain | Oct. 30, 1945 |